US010415724B2

(12) United States Patent
Wegner

(10) Patent No.: US 10,415,724 B2
(45) Date of Patent: Sep. 17, 2019

(54) STRUT CLIP

(71) Applicant: Paul Brett Wegner, El Segundo, CA (US)

(72) Inventor: Paul Brett Wegner, El Segundo, CA (US)

(*) Notice: Subject to any disclaimer, the term of this patent is extended or adjusted under 35 U.S.C. 154(b) by 119 days.

(21) Appl. No.: 15/649,499

(22) Filed: Jul. 13, 2017

(65) Prior Publication Data
US 2018/0017189 A1    Jan. 18, 2018

Related U.S. Application Data

(60) Provisional application No. 62/361,868, filed on Jul. 13, 2016.

(51) Int. Cl.
F16B 2/04 (2006.01)
F16L 3/24 (2006.01)

(52) U.S. Cl.
CPC . F16L 3/24 (2013.01); F16B 2/04 (2013.01)

(58) Field of Classification Search
USPC .......................................................... 248/72
See application file for complete search history.

(56) References Cited

U.S. PATENT DOCUMENTS 2,863,625 A * 12/1958 Attwood .................... F16L 3/24
                                                            248/62
3,522,921 A *  8/1970 Lytle ........................ F16L 3/24
                                                            248/62
3,527,432 A *  9/1970 Lytle ........................ F16L 3/10
                                                            248/62
3,547,385 A * 12/1970 Kindorf .................. F16L 3/221
                                                            248/62
4,417,711 A * 11/1983 Madej .................... F16L 3/1041
                                                            248/74.4
4,429,440 A    2/1984 Laughlin et al.
5,022,614 A *  6/1991 Rinderer ................. F16L 3/105
                                                            248/62

(Continued)

OTHER PUBLICATIONS

Calbrite 316 Stainless Steel Conduit Strut Clamp, Polished Brite Finish, Retrieve from Internet URL: on May 10, 2016, pp. 1- 2.

(Continued)

Primary Examiner — Monica E Millner
(74) Attorney, Agent, or Firm — Pejman Yedidsion; Brooks Acordia IP Law, PC

(57) ABSTRACT

An apparatus is disclosed as comprising a first leg of a strut clip; a first rotatable element rotatably attached to the first leg of the strut clip at a first aperture; a second rotatable element rotatably attached to the first leg of the strut clip at the first aperture, where the first and second rotatable elements may have tapered lower edges; a first notch of the first rotatable element may be disposed on a longitudinal edge of the first rotatable element; a second notch of the second rotatable element may be disposed on a longitudinal edge of the second rotatable element; one or more stops may be disposed in the first leg of the strut clip, where the one or more stops may limit rotation of at least one of: the first rotatable element and the second rotatable element; and a first elastic element may be disposed between distal longitudinal edges of the first rotatable element and the second rotatable element.

19 Claims, 11 Drawing Sheets

(56) References Cited

U.S. PATENT DOCUMENTS

| | | | | |
|---|---|---|---|---|
| 5,984,243 | A * | 11/1999 | Pfaller | F16L 3/1066 |
| | | | | 248/74.1 |
| 6,386,488 | B1 * | 5/2002 | Menachem | F16L 3/24 |
| | | | | 248/62 |
| 6,572,057 | B1 * | 6/2003 | Roth | F16L 3/24 |
| | | | | 248/217.2 |
| 8,322,661 | B2 * | 12/2012 | Oh | F16L 3/24 |
| | | | | 248/230.6 |
| 2002/0000498 | A1 * | 1/2002 | Workman | F16L 3/24 |
| | | | | 248/62 |
| 2011/0084179 | A1 * | 4/2011 | Wiedner | F16L 3/12 |
| | | | | 248/67.7 |
| 2015/0276092 | A1 * | 10/2015 | Oliver | F16L 3/24 |
| | | | | 248/65 |
| 2015/0316178 | A1 * | 11/2015 | Patil | F16L 3/24 |
| | | | | 248/67.5 |

OTHER PUBLICATIONS

Display Part MU025, Retrieved from the Internet URL:< http://www.unistrut.us/index.php?WP=CAT_DETAIL&s=s05&p=mu025<on Jun. 22, 2016, p. 2.

Submittal Sheet, Strut Clamp Saddle Type, Orbit Industries, Inc., Retrieved from the Internet, URL: , www.orbitelectric.com on Jun. 24, 2016.

* cited by examiner

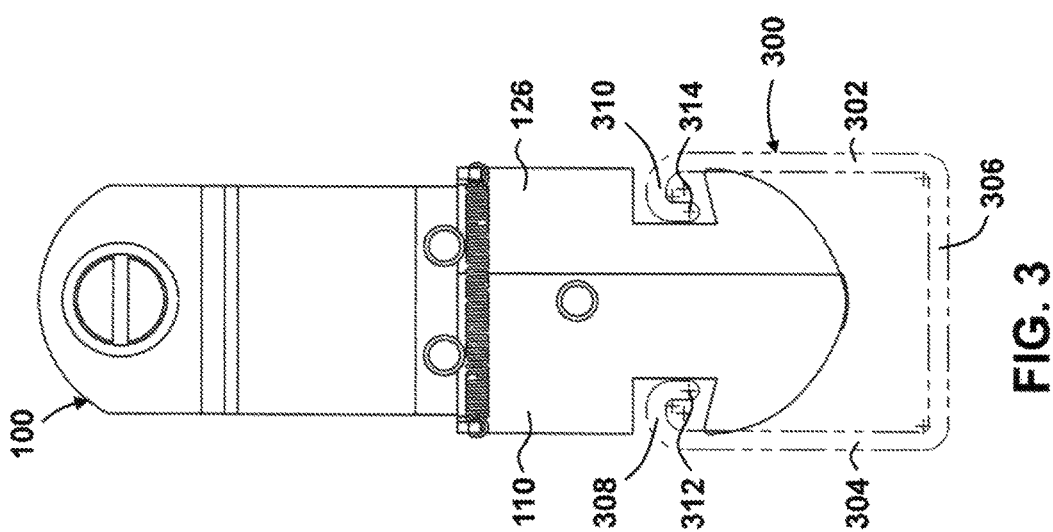

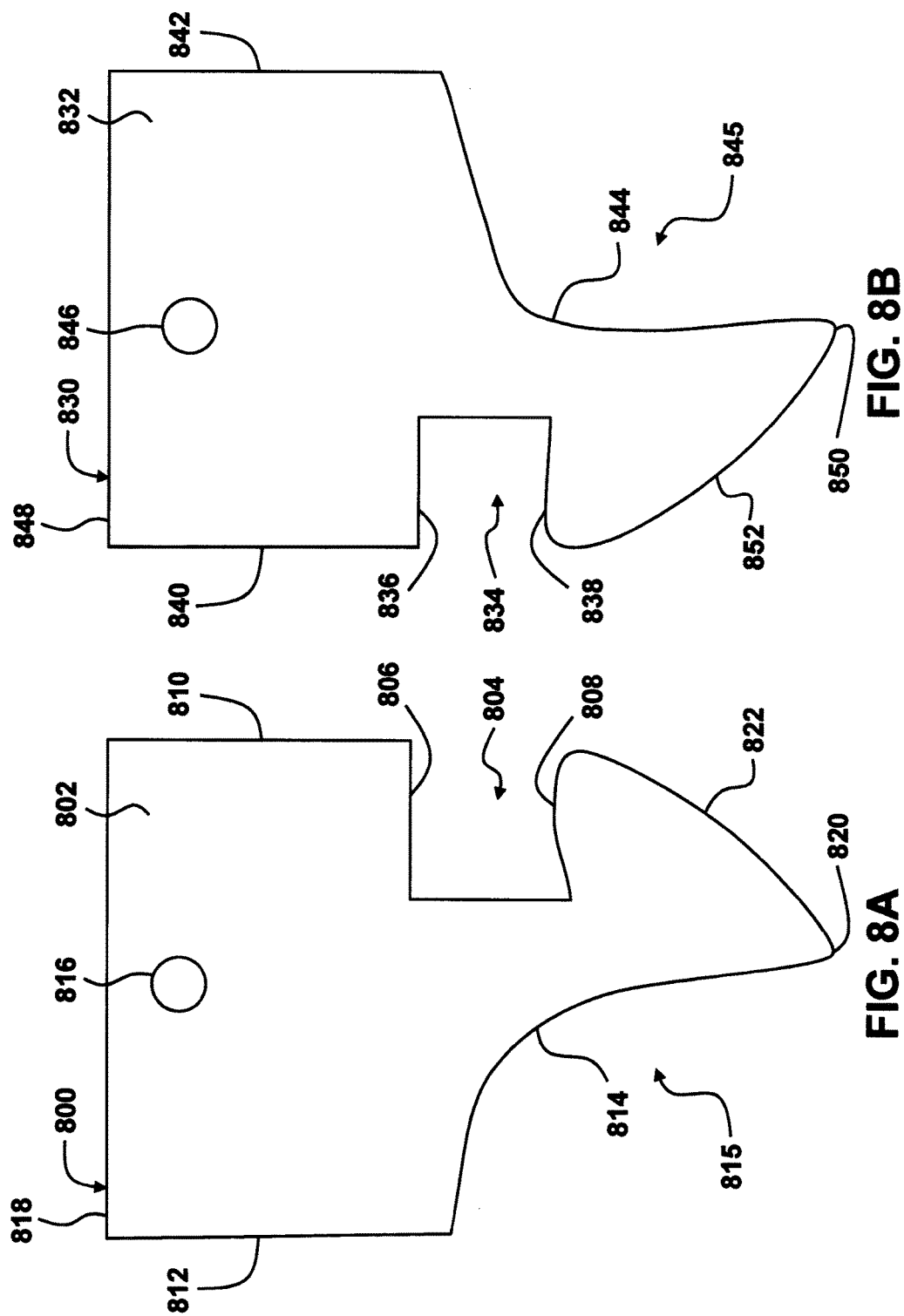

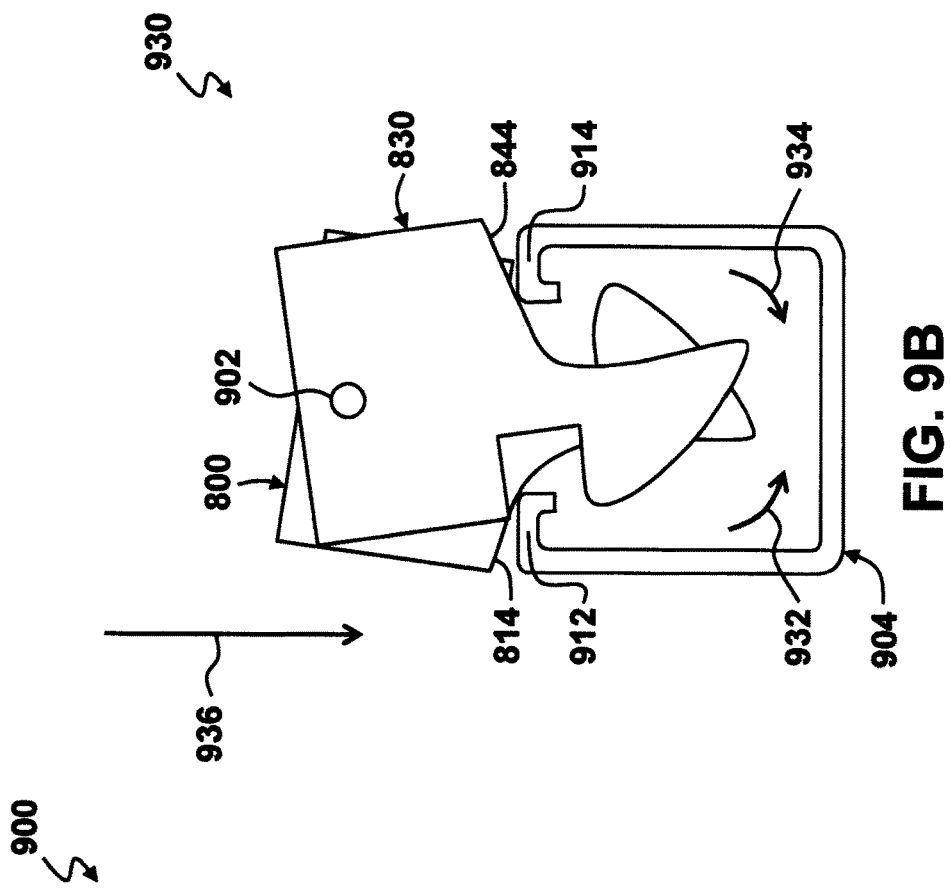
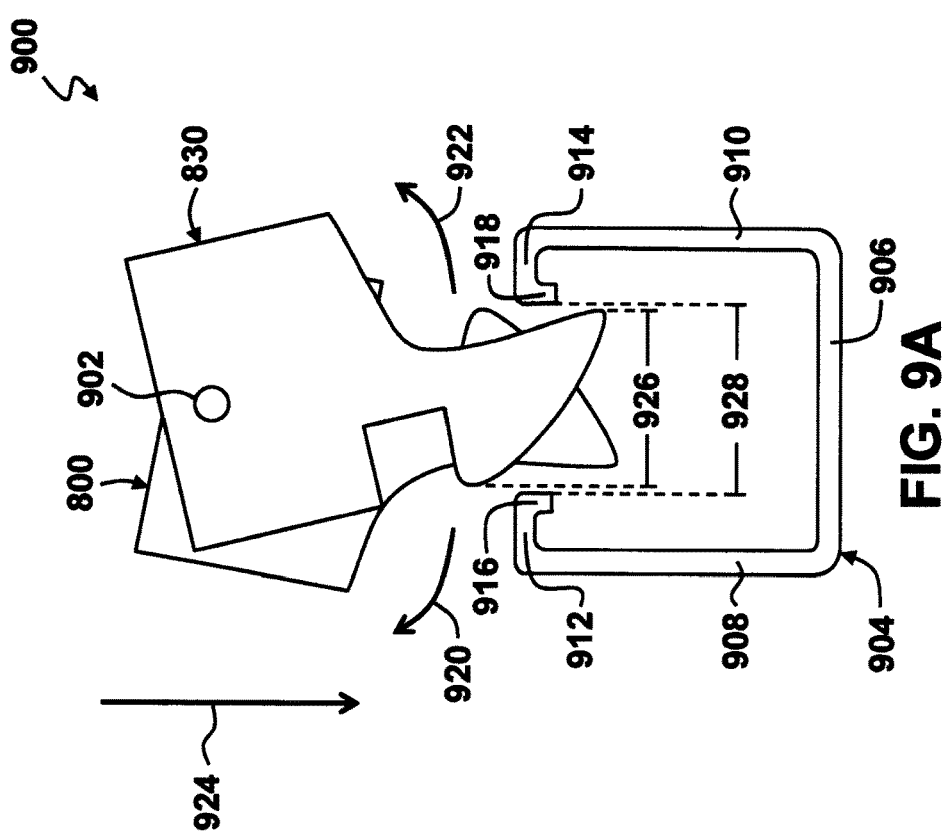

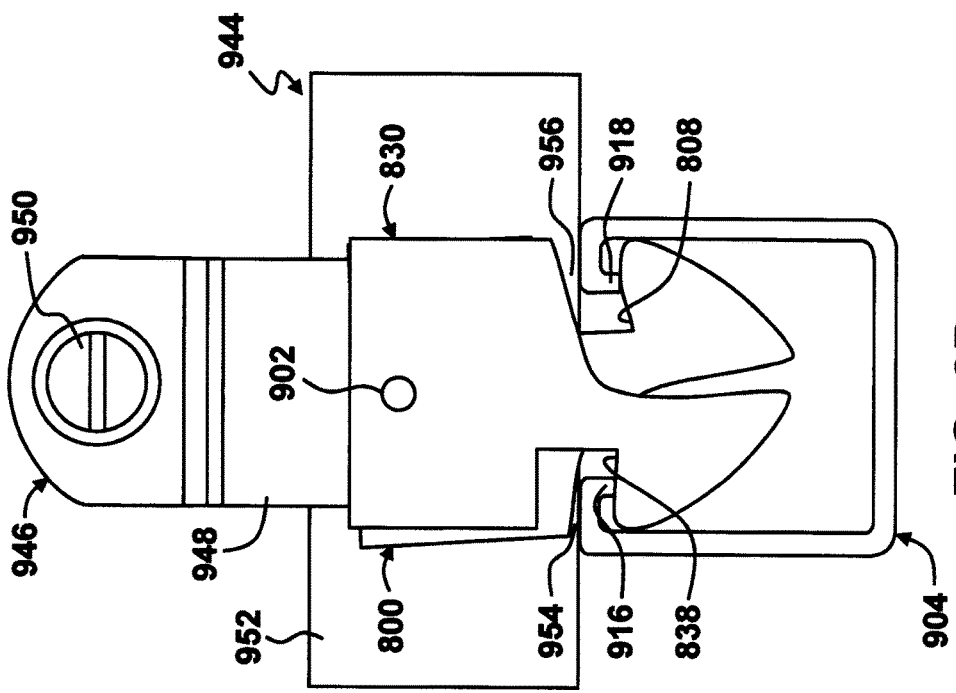
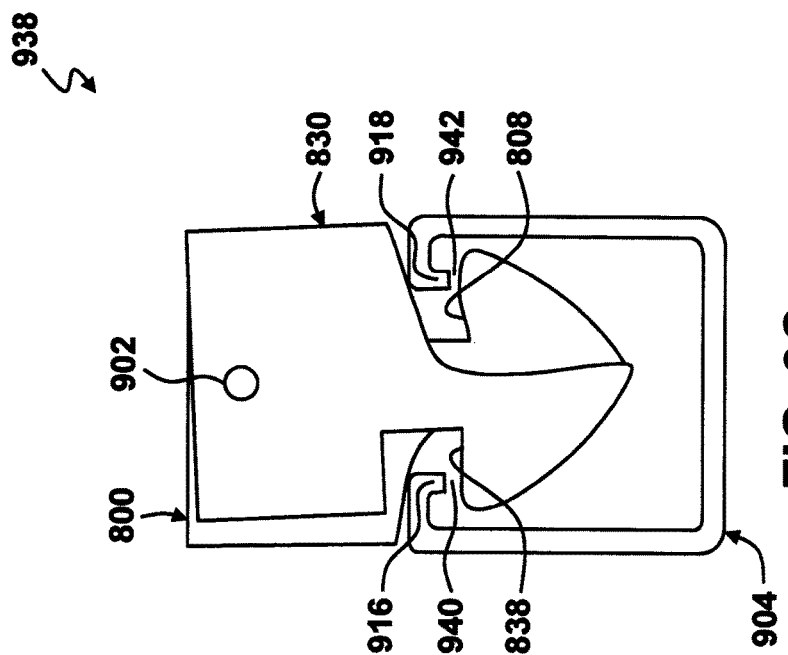

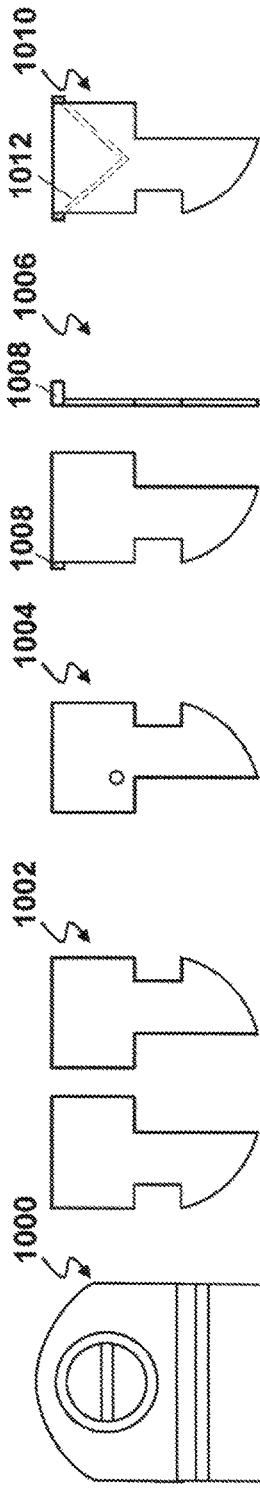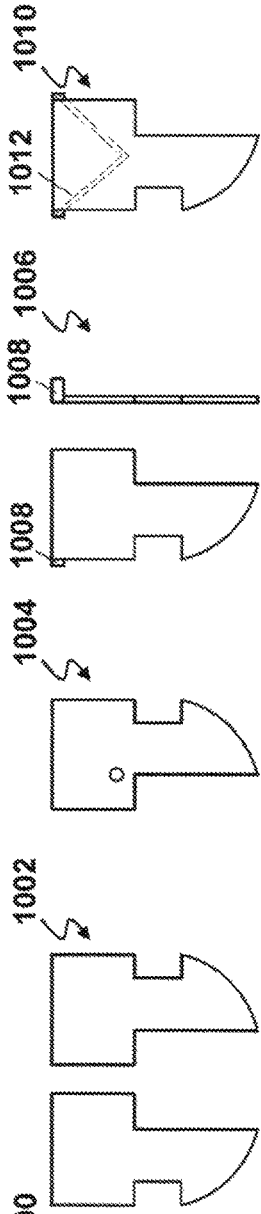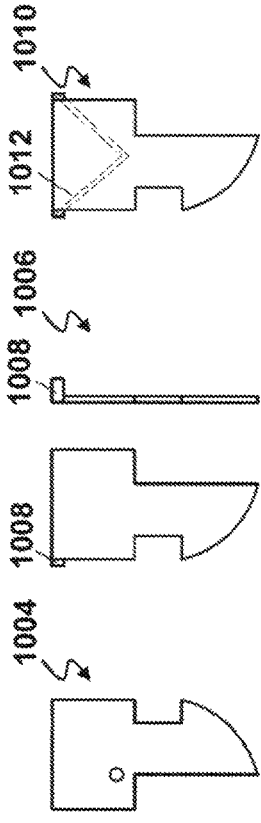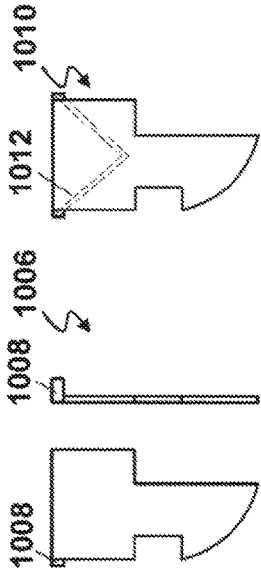

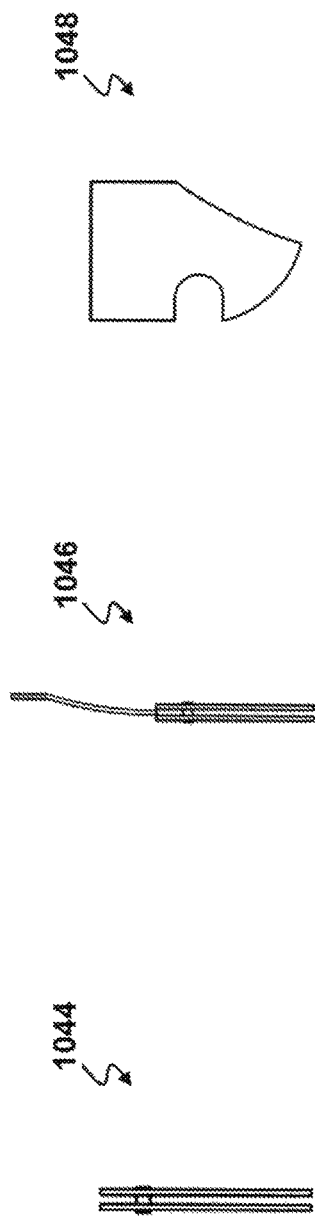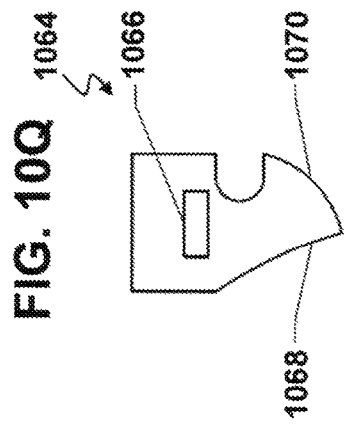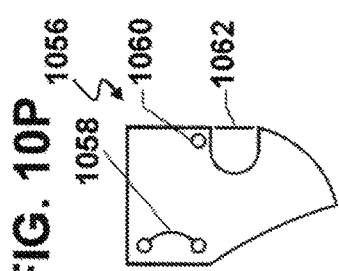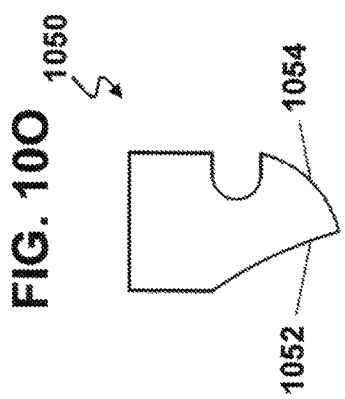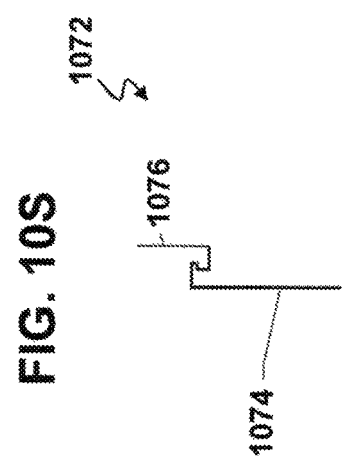

STRUT CLIP

CROSS-REFERENCE TO RELATED APPLICATIONS

This application claims priority to and the benefit of U.S. Provisional Patent Application No. 62/361,868, filed Jul. 13, 2016, the contents of which are hereby incorporated by reference herein for all purposes.

TECHNICAL FIELD

Embodiments relate generally to systems, methods, and devices for strut clips, and more particularly to a clamping and support clip for securing conduits to a supporting structure.

BACKGROUND

Conduits such as pipes or tubes may need to be secured to a supporting structure such as a channel, wire, rod, and/or bar. Existing support clips may be difficult to secure in place, and may require either sliding the support clip along the length of the supporting structure or tightening one or more fasteners in a difficult to access location.

SUMMARY

Exemplary system embodiments may include: a first rotatable element having a first edge, a second edge, and a first aperture, where the first edge may include a first notch and a first tapered lower edge, and where the second edge may include a first arcuate lower portion; a second rotatable element including a third edge, a fourth edge, and a second aperture, where the third edge may include a second notch and a second tapered lower edge, and where the fourth edge may include a second arcuate lower portion; and a pivoting member disposed through the first aperture and the second aperture; where the first rotatable element and the second rotatable element may pivot between a first position and a second position via the pivoting member, where a width of a lower portion of the first rotatable member and second rotatable member in the first position may be less than a width of a strut opening, and where a width of the lower portion of the first rotatable member and second rotatable member in the second position may be greater than the width of the strut opening.

In additional exemplary system embodiments, the first notch may include a first innermost edge and a first re-entrant edge. The second notch may include a second innermost edge and a second re-entrant edge. The first re-entrant edge and the second re-entrant edge may contact downward flanges of a strut in a third position, and the position of the first and second rotatable elements relative to the strut may be maintained in the third position. The first innermost edge and the second innermost edge may be flat relative to a local plane in the first position. The first re-entrant edge and the second re-entrant edge may be angled relative to a local plane in the first position.

Additional exemplary system embodiments may include a first leg, where the pivoting member may be disposed through the first leg. Additional exemplary system embodiments may also include: a second leg, where the first leg may be detachably attached to the first leg via a fastener; at least one stop disposed in the first leg, where the at least one stop limits rotation of at least one of: the first rotatable element and the second rotatable element relative to the first leg; and/or at least one elastic element connected to the first rotatable element and the second rotatable element, where the at least one elastic element maintains the first rotatable element and the second rotatable element in the first position. The at least one elastic element may be a spring.

The exemplary system embodiment may also include: a protrusion disposed on the first rotatable element; and a depression disposed on the second rotatable element; where the protrusion may be secured in the depression to prevent pivoting of the first rotatable element relative to the second rotatable element in the first position. An aperture may be disposed in the second rotatable element, where the aperture receives the protrusion in the second position to prevent further pivoting of the first rotatable element relative to the second rotatable element.

An exemplary apparatus embodiment may include: a first leg of a strut clip; a first rotatable element rotatably attached to the first leg of the strut clip at a first aperture, where the first rotatable element may have a tapered lower edge; a second rotatable element rotatably attached to the first leg of the strut clip at the first aperture, where the second rotatable element may have a tapered lower edge; a first notch of the first rotatable element disposed on a longitudinal edge of the first rotatable element; a second notch of the second rotatable element disposed on a longitudinal edge of the second rotatable element, where the first notch may be disposed distal from the second notch; one or more stops disposed in the first leg of the strut clip, where the one or more stops may limit rotation of at least one of: the first rotatable element and the second rotatable element via contact with at least one of: an upper edge of the first rotatable element and an upper edge of the second rotatable element; and a first elastic element disposed between distal longitudinal edges of the first rotatable element and the second rotatable element.

In additional exemplary apparatus embodiments, the one or more stops may include two stops, where a first stop of the two stops may be positioned to rotatably restrain the first rotatable element via contact with the upper edge of the first rotatable element, and where a second stop of the two stops may be positioned to rotatably restrain the second rotatable element via contact with the upper edge of the second rotatable element. The first elastic element may be disposed between a first protrusion of the first rotatable element and a second protrusion of the second rotatable element, where the first protrusion may be substantially perpendicular to a front face of the first rotatable element, where the second protrusion may be substantially perpendicular to a front face of the second rotatable element, and the first protrusion may be substantially parallel to the second protrusion. The first elastic element may be a spring.

Additional exemplary apparatus embodiments may include: a second leg of the strut clip; a third rotatable element rotatably attached to the second leg of the strut clip at a second aperture, where the third rotatable element may have a tapered lower edge; a fourth rotatable element rotatably attached to the second leg of the strut clip at the second aperture, where the fourth rotatable element may have a tapered lower edge; a third notch of the third rotatable element disposed on a longitudinal edge of the third rotatable element; a fourth notch of the fourth rotatable element disposed on a longitudinal edge of the fourth rotatable element, where the third notch may be disposed distal from the fourth notch; one or more stops disposed in the second leg of the strut clip, where the one or more stops may limit rotation of at least one of: the third rotatable element and the fourth rotatable element via contact with at least one of: an upper edge of the third rotatable element and an upper edge of the fourth rotatable element; and a second elastic element disposed between distal longitudinal edges of the third rotatable element and the fourth rotatable element. The apparatus may also include a third aperture, where the first leg of the strut clip and the second leg of the strut clip may be detachably attached via the third aperture. The first leg of the strut clip may be identical to the second leg of the strut clip.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 3 depicts a front view of the exemplary strut clip embodiment of FIG. 1A in a strut;

FIG. 8A depicts a front view of an exemplary first rotatable element;

FIG. 8B depicts a front view of an exemplary second rotatable element;

FIG. 9A depicts two exemplary rotatable elements in a first position being inserted into a strut;

FIG. 9B depicts two exemplary rotatable elements in a second position;

FIG. 9C depicts two exemplary rotatable elements in a third position in the strut;

FIG. 9D depicts an exemplary strut clip fastening a pipe against a strut in a fourth position; and FIGS. 10A-10U depict alternate exemplary strut clip embodiments.

DETAILED DESCRIPTION

A strut clip is disclosed comprising two rotatable elements disposed on each leg of the strut clip. The rotatable elements of the strut clip may rotate upon contact of their respective tapered lower edges with an inturned top wall of a strut. Once the rotatable elements enter into the strut, the rotatable elements may rotate back towards their original position, securing respective notches of the rotatable elements about downturned flanges of the strut. That is, any subsequent upward and/or downward force on the strut clip relative to the strut will not dislodge the strut clip from the strut. The disclosed strut clip may therefore be installed into a strut via downward force on the strut clip relative to the strut and any further fastening, such as by tightening a bolt, may not be required. A conduit, such as a pipe, may be inserted into the opening provided by the strut clip and supported by the strut clip and/or strut.

Figure 1A:
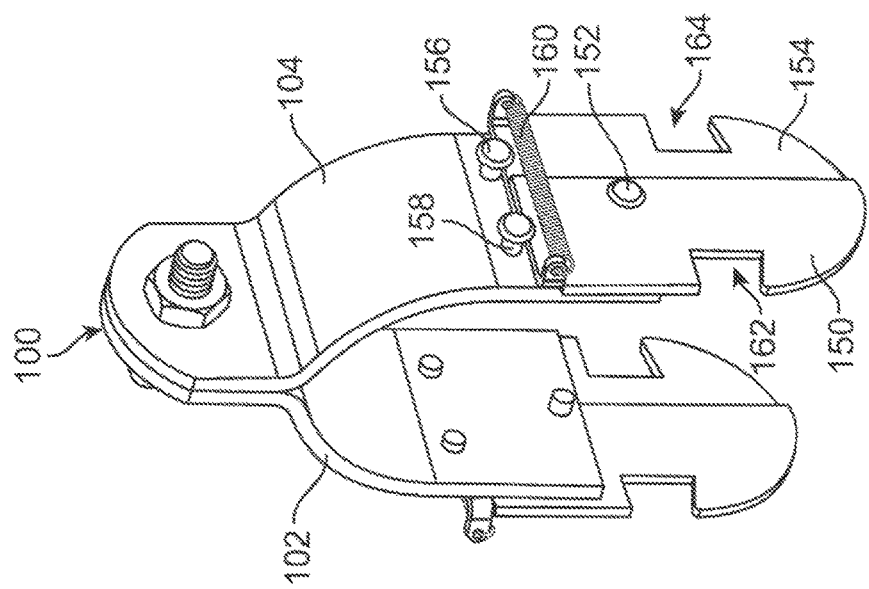
FIG. 1A depicts a perspective view of an exemplary strut clip embodiment in a first position.

FIG. 1A depicts a perspective view of an exemplary strut clip embodiment in a first position. A strut clip 100 may comprise a first leg 102 and a second leg 104 detachably attached via an aperture 106. The aperture 106 may have a fastener 108, such as a nut, bolt, and washer, disposed through the aperture 106. A first rotatable element 110 may be rotatably attached to the first leg 102 at an aperture 112. The first rotatable element 110 may rotate relative to the first leg 102 via the aperture 112. The first rotatable element 110 may have a tapered lower edge 114 and a notch 116. The notch 116 may include an innermost edge 118 and a re-entrant edge 120. The innermost edge 118 may be flat relative to a local plane in the first position. The re-entrant edge 120 may be angled relative to a local plane. A first stop 122 may be disposed in the first leg 102 of the strut clip 100. The first stop 122 may limit rotation of the first rotatable element 110 via contact with an upper edge 124 of the first rotatable element 110.

A second rotatable element 126 may be rotatably attached to the first leg 102 at the aperture 112. The second rotatable element 126 may rotate relative to the first leg 102 via the aperture 112. The second rotatable element 126 may have a tapered lower edge 128 and a notch 130. The notch 130 may include an innermost edge 132 and a re-entrant edge 134. The innermost edge 132 may be flat relative to a local plane in the first position. The re-entrant edge 134 may be angled relative to a local plane. A second stop 136 may be disposed in the first leg 102 of the strut clip 100. The second stop 136 limits rotation of the second rotatable element 126 via contact with an upper edge 138 of the second rotatable element 126.

A first elastic element 140 may be disposed between distal longitudinal edges of the first rotatable element 110 and the second rotatable element 126. The first elastic element 140 may, in one exemplary embodiment, be a spring. The first elastic element may be disposed between a first protrusion 142 of the first rotatable element 110 and a second protrusion 144 of the second rotatable element 125. The first protrusion 142 may be substantially perpendicular to a front face 146 of the first rotatable element 110. The second protrusion 144 may be substantially perpendicular to a front face 148 of the second rotatable element 126. The first protrusion 142 may be substantially parallel to the second protrusion 144.

The stops 122, 136 are shown as two stops for respective rotatable elements 110,126. In some embodiments, the stops 122, 136 may be replaced by a single centered stop that restricts movement of both of the rotatable elements 110, 126. The position and number of stops 122, 136 may be adjusted along with the shape of the rotatable elements 110, 126 to limit rotation of the rotatable elements 110, 126 relative to the first leg 102.

Figure 1B:
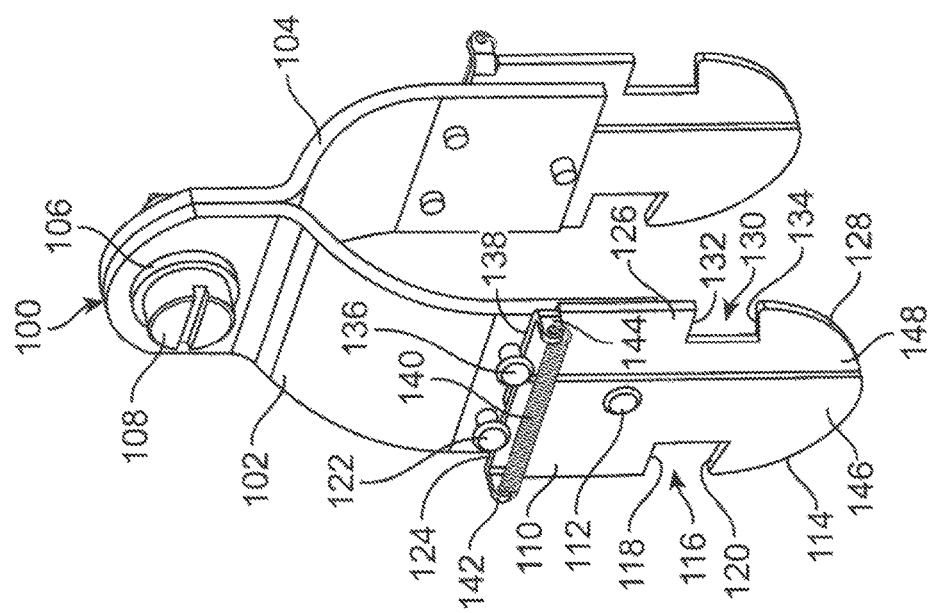
FIG. 1B depicts another perspective view of the exemplary strut clip embodiment of FIG. 1A in the first position.

FIG. 1B depicts another perspective view of the exemplary strut clip embodiment of FIG. 1A in the first position. The strut clip 100 may comprise the first leg 102 and the second leg 104 detachably attached via the aperture 106. The strut clip may also comprise a third rotatable element 150 rotatably attached to the second leg 104 at an aperture 152, a fourth rotatable element 154 rotatably attached to the second leg 104 at the aperture 152, stops 156, 158, a second elastic element 160, and notches 162, 164. The first leg 102 of the strut clip 100 may be identical to the second leg 104 of the strut clip.

Figure 2B:
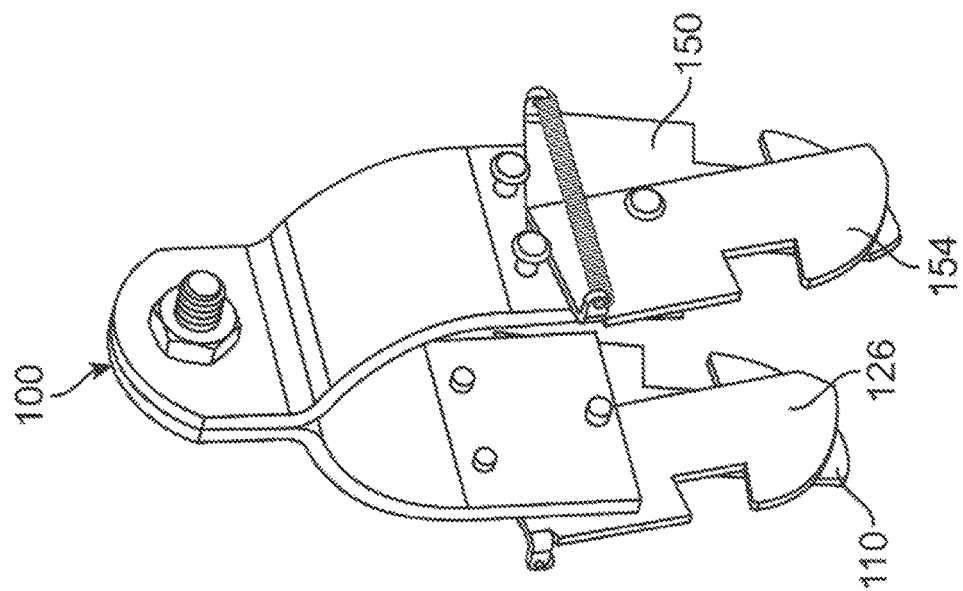
FIG. 2B depicts another perspective view of the exemplary strut clip embodiment of FIG. 1A in the second position.
Figure 2A:
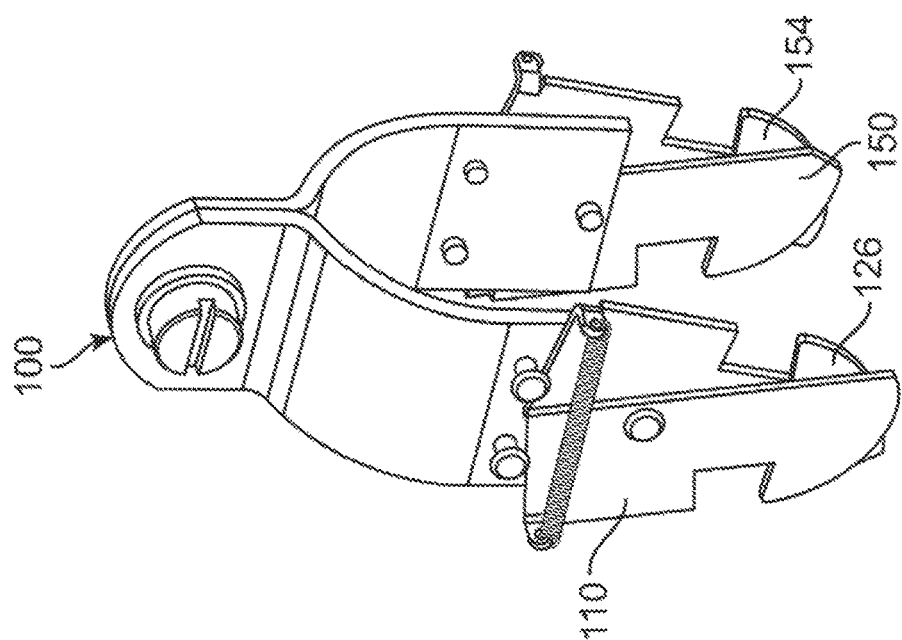
FIG. 2A depicts a perspective view of the exemplary strut clip embodiment of FIG. 1A in a second position.

FIGS. 2A-2B depict perspective views of the exemplary strut clip embodiment of FIG. 1A in a second position, i.e., engaged position. The rotatable elements 110, 126, 150, 154 of the strut clip 100 rotate relative to one another to fit into a strut (See FIG. 3) via downward force once engaged. Upon the respective notches of the rotatable elements securing about the downturned flanges of the strut, the exemplary strut clip may be affixed in position by a variety of means that may be well known in the art.

FIG. 3 depicts a front view of the exemplary strut clip embodiment of FIG. 1A in a strut. The strut clip 100 may comprise rotatable elements 110, 126 disposed in a strut 300. The strut 300 may include sidewalls 302, 304, a bottom wall 306, upturned top walls 308, 310, and downturned flanges 312, 314. Once the rotatable elements 110, 126 enter into the strut 300, the rotatable elements 110, 126 may rotate back towards their original position, securing respective notches of the rotatable elements 110, 126 about the downturned flanges 312, 314 of the strut 300. Any subsequent upward and/or downward force on the strut clip 100 relative to the strut 300 will not dislodge the strut clip 100 from the strut 300.

Figure 4:
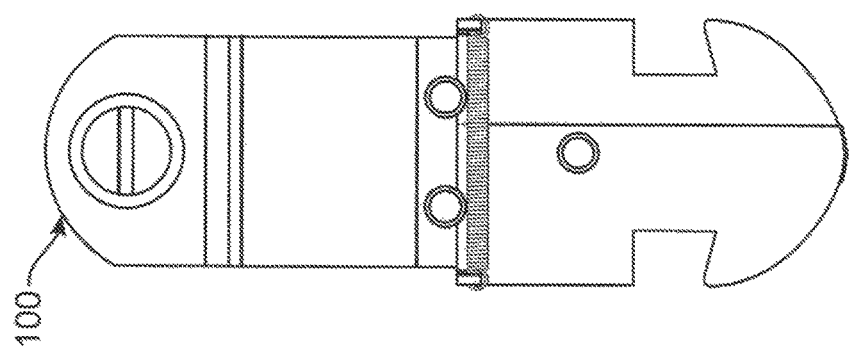
FIG. 4 depicts a front view of the exemplary strut clip embodiment of FIG. 1A.

FIG. 4 depicts a front view of the exemplary strut clip embodiment of FIG. 1A. The strut clip 100 is shown in a first position. The strut clip 100 is in a first position before being inserted into a strut and once installed in a strut. The strut clip is in a second position (See FIGS. 2A-2B) as the tapered lower edges of the rotatable elements rotate from contact with the inturned top wall of the strut (See FIG. 3).

Figure 5:
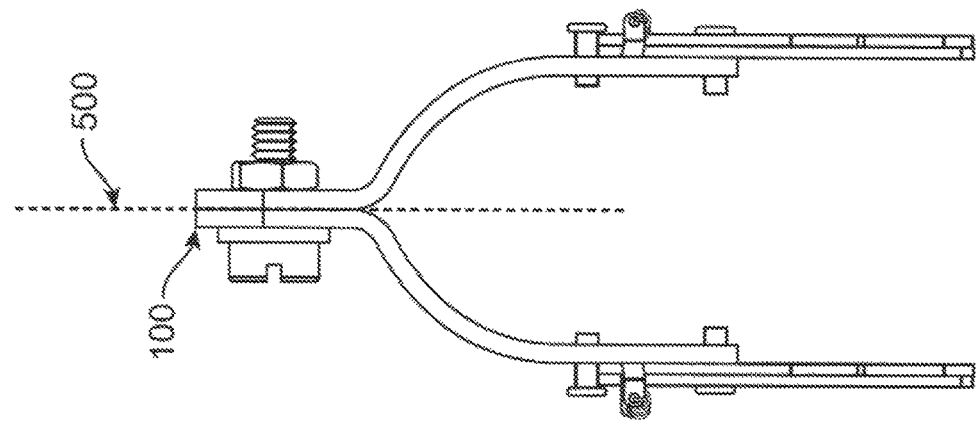
FIG. 5 depicts a side view of the exemplary strut clip embodiment of FIG. 1A.

FIG. 5 depicts a side view of the exemplary strut clip embodiment of FIG. 1A. The strut clip 100 may be identical about a plane 500, depicted by dashed lines, between the first leg and the second leg of the strut clip 100.

Figure 6:
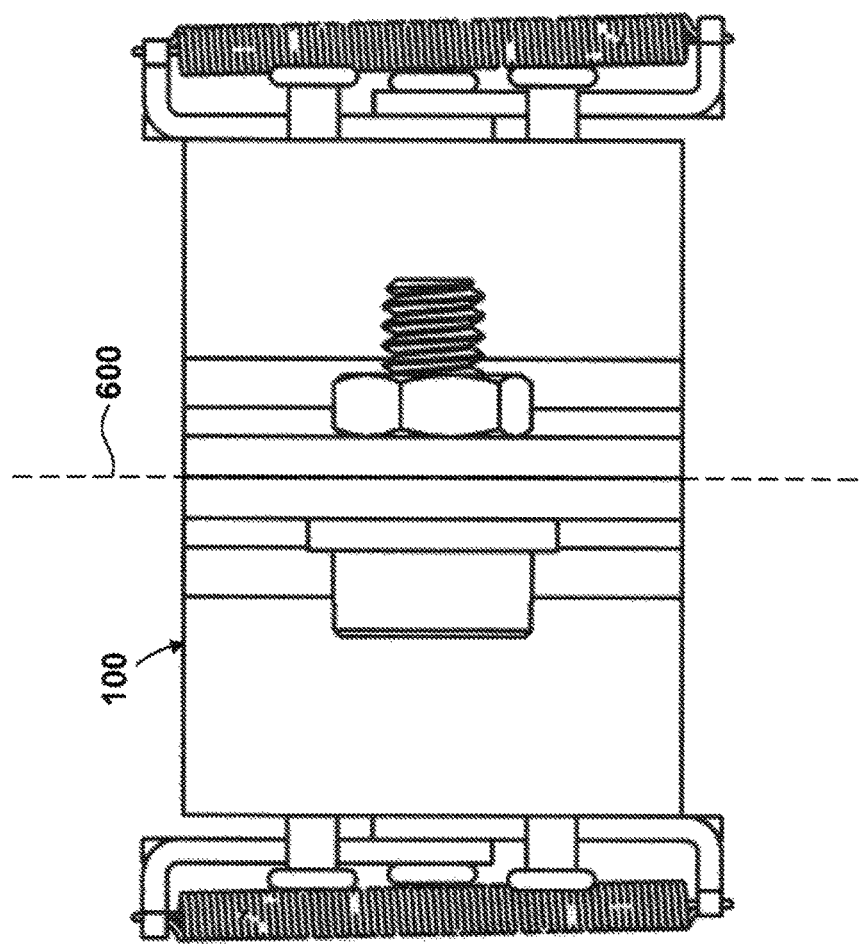
FIG. 6 depicts a top view of the exemplary strut clip embodiment of FIG. 1A.

FIG. 6 depicts a top view of the exemplary strut clip embodiment of FIG. 1A. The strut clip 100 may be identical about a plane 600, depicted in dashed lines, between the first leg and the second leg of the strut clip 100. FIG. 6 shows an exemplary compression spring as providing an outward torque to keep the first leg and the second leg in the first position. Other embodiments may utilize means for exerting a force between the first leg and the second leg, via for example, stored energy, to resist applied compression forces, or in the push mode, store energy to provide the push force and keep the first leg and second leg from further movement.

Figure 7B:
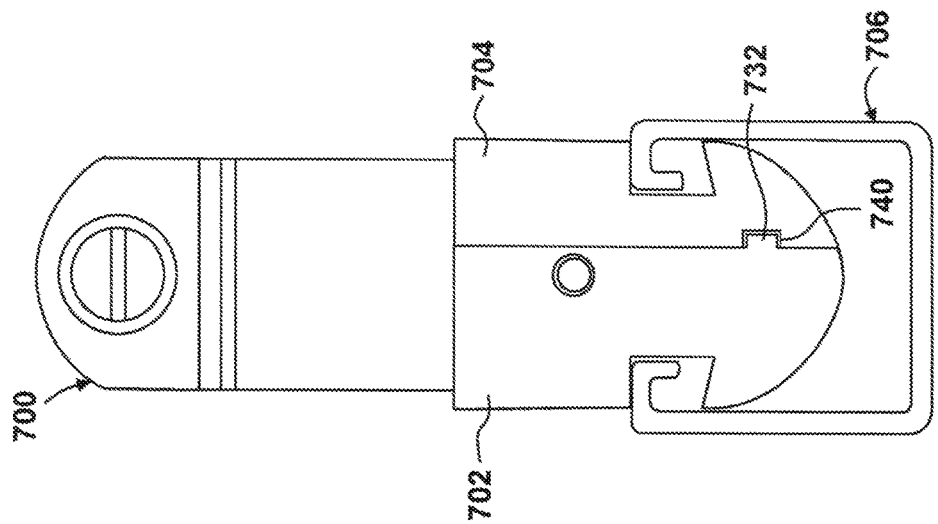
FIG. 7B depicts a front view of the alternate exemplary strut clip embodiment of FIG. 7A in a locked position in the strut.
Figure 7A:
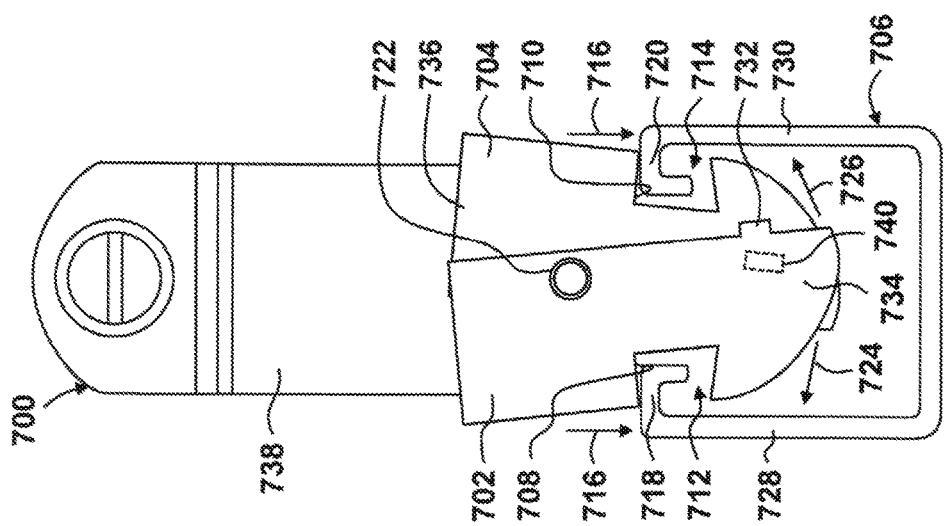
FIG. 7A depicts a front view of an alternate exemplary strut clip embodiment being inserted into a strut.

FIG. 7A depicts a front view of an alternate exemplary strut clip embodiment being inserted into a strut. A strut clip 700 may have a first rotatable element 702 and a second rotatable element 704 disposed in a first position for installation into a strut 706. The innermost edges 708, 710 of the notches 712, 714 of the rotatable elements 702, 704 may be flat relative to a local plane in the first position. The re-entrant edges may be angled relative to a local plane in the first position. Applying a downward force 716 on the strut clip 700 relative to the strut 706 may cause these angled innermost edges 708, 710 to contact inturned top walls 718, 720 of the strut. This contact causes a torque or momentum about an aperture 722, such that the rotatable elements 702, 704 rotate 724, 726 outwards towards the sidewalls 728, 730 of the strut 730.

The first rotatable element 702 may comprise a protrusion 732 substantially perpendicular to a front face 734 of the first rotatable element 702 and extending towards a front face 736 of the second rotatable element 704. The protrusion 732 may press against the front face 736 of the second rotatable element which causes friction and prevents the rotatable elements 702, 704 from rotating relative to one another as well as causing friction and preventing rotation between the second rotatable element 704 and a first leg 738 of the strut clip. In some embodiments, the front face 736 of the second rotatable element may comprise a depression, such as a dimple, for further securing the protrusion 732 of the first rotatable element 702. The second rotatable element 704 may comprise an aperture 740, shown in dashed lines, for receiving the protrusion 732 in a second position.

FIG. 7B depicts a front view of the alternate exemplary strut clip embodiment of FIG. 7A in a locked position in the strut. The protrusion 732 of the first rotatable element 702 may be inserted through the aperture 740 of the second rotatable element 704 in the second position. The first rotatable element 702 may not rotate relative to the second rotatable element 704 as it is restrained in rotation by the placement of the protrusion 732 in the aperture 740. Accordingly, any subsequent upward and/or downward force on the strut clip 700 relative to the strut 706 will not dislodge the strut clip 700 from the strut 706. The disclosed strut clip 700 may therefore be installed into a strut via downward force on the strut clip relative to the strut and any further fastening, such as by tightening a bolt, may not be required.

FIG. 8A depicts a front view of an exemplary first rotatable element 800. The first rotatable element 800 has a first edge 810, a second edge 812, a top 818, and a bottom 820. The first edge 810 includes a first notch 804 with a first innermost edge 806 and a first re-entrant edge 808. The first edge 810 also includes a first tapered lower edge 822 proximate the bottom 820 of the first rotatable element 800. The second edge 812 includes a first arcuate lower portion 814 proximate the bottom 820 of the first rotatable element 800. A lower portion 815 of the first rotatable element 800 includes at least a portion of the first arcuate lower portion 814, the first tapered lower edge 822, and the first notch 804. A first aperture 816 is disposed in a front face 802 of the first rotatable element 800.

FIG. 8B depicts a front view of an exemplary second rotatable element 830. The second rotatable element 830 has a third edge 840, a fourth edge 842, a top 848, and a bottom 850. The third edge 840 includes a second notch 834 with a second innermost edge 836 and a second re-entrant edge 838. The third edge 840 also includes a second tapered lower edge 852 proximate the bottom 850 of the second rotatable element 830. The fourth edge 842 includes a second arcuate lower portion 844 proximate the bottom 850 of the second rotatable element 830. A lower portion 845 of the second rotatable element 830 includes at least a portion of the second arcuate lower portion 844, the second tapered lower edge 852, and the second notch 834. A second aperture 846 is disposed in a front face 832 of the second rotatable element 830.

FIG. 9A depicts two exemplary rotatable elements 800, 830 in a first position 900 being inserted into a strut 904. The first rotatable element 800 may be rotated 920 relative to the second rotatable element 830 about a pivoting member 902. The second rotatable element 830 may be rotated 922 in an opposite direction as the rotation 920 of the first rotatable element 800. A downward movement 924 may be applied to the first and second rotatable members 800, 830 towards an opening in the strut 904. In the first position 900, a width 926 of the first and second rotatable members 800, 830 is less than a width 928 of an opening in the strut 904.

The strut 904 includes a bottom wall 906; sidewalls 908, 910; upturned top walls 912, 914; and downward flanges 916, 918. The bottom portions of the first and second rotatable elements 800, 830 may be inserted into the opening of the strut 904 in the first position 900.

FIG. 9B depicts two exemplary rotatable elements 800, 830 in a second position 930. In the second position 930, the first and second rotatable elements 800, 830 continue to be inserted into the strut 904 via a downward movement 936. The downward movement 936 may be a user pressing the disclosed strut clip into the strut opening. As the downward movement 936 force is applied, the arcuate portions 814, 844 of the first and second rotatable elements 800, 830 contacts the upturned top walls 912, 914 of the strut 904. This contact causes the first rotatable element 800 to rotate 932 relative to the second rotatable element 830 about the pivoting member 902. This contact also causes the second rotatable element 830 to rotate 934 in an opposite direction as the rotation 932 of the first rotatable element 800. This rotation 932, 934 causes the width of the first and second rotatable elements 800, 830 to be greater than the width of the opening in the strut 904.

FIG. 9C depicts two exemplary rotatable elements 800, 830 in a third position 938 in the strut 904. The first and second rotatable elements 800, 830 are fully inserted into the strut 904 in the third position 938, and no more rotation of the first rotatable element 800 relative to the second rotatable element 830 occurs about the pivoting member 902. The width of the first and second rotatable elements 800, 830 remains greater than the width of the opening in the strut 904. A gap 940 is present between the re-entrant edge 838 of the second rotatable element 830 and the downward flange 916 of the strut 904. Another gap 942 is present between the re-entrant edge 808 of the first rotatable element 800 and the downward flange 918 of the strut 904. If a force was applied in an upward direction away from the opening of the strut 904, the re-entrant edges 808, 838 of the first and second rotatable elements 800, 830 would prevent removal from the strut 904.

FIG. 9D depicts an exemplary strut clip 946 fastening a pipe 952 against the strut 904 in a fourth position 944. The first and second rotatable elements 800, 830 may be part of the disclosed strut clip 946. The strut clip 946 includes a first leg 948, a second leg hidden by the first leg 948, and a fastener 950. As the strut clip 946 fastens the pipe 952 to the strut 904 in the fourth position 944, the re-entrant edge 838 of the second rotatable element 830 contacts the downward flange 916 of the strut 904 and a gap 954 is created between the first arcuate lower portion of the first rotatable element 800 and the strut 904. The re-entrant edge 808 of the first rotatable element 808 contacts the downward flange 918 of the strut 904 in the fourth position, and a gap 956 is created between the second arcuate lower portion of the second rotatable element 830 and the strut 904. With the re-entrant edges 808, 838 of the first and second rotatable elements 800, 830 in contact with the downward flanges 916, 918 of the strut 904, no further tension or locking mechanism is required to maintain the position of the first rotatable element 800 relative to the second rotatable element 830 in the strut 904. The first and second rotatable elements 800, 830 may be removed from the strut 904 by removing the fastener 950 and/or pipe 952, rotating the first and second rotatable elements 800, 830 to the first position, and lifting the lower portions of the first and second rotatable elements 800, 830 out from the opening of the strut 904.

FIGS. 10A-10U depict alternate exemplary strut clip embodiments. FIG. 10A depicts a strut clip 1000 with two rotatable elements connected by a spring. FIG. 10B depicts two rotatable elements 1002 for a strut clip. FIG. 10C depicts a location of an aperture in one embodiment of a rotatable element 1004. FIG. 10D depicts front and side views of a rotatable element 1006 having a portion bent to hold a spring 1008 or other tensioning device. FIG. 10E depicts a rotatable element 1010 with a spring 1012 shown in dashed lines. FIG. 10F depicts a front view of a rotatable element 1014. FIG. 10G depicts a side view of two rotatable elements 1016, with a rivet shown in one embodiment. FIG. 10H depicts two rotatable elements 1018 with a pin 1020. FIG. 10I depicts two rotatable elements 1022 in a rotated position with a pin 1024 in an alternate location. FIG. 10J depicts a strut clip 1026 having slide pins 1028 and a slide 1029. FIG. 10K depicts a strut clip 1030 having a slideable element to fit within an opening of a strut in a first position and then slide to a second position to prevent removal of the slideable element from the strut. FIG. 10L depicts a slideable element 1032 of a strut clip having a slide aperture 1034. FIG. 10M depicts a first leg 1036 of a strut clip having slide pins 1038. FIG. 10N depicts a rotatable element 1040 having a spring 1042. FIG. 10O depicts a side view of two slideable elements 1044. FIG. 10P depicts a side view of two slideable elements and a first leg of a strut clip 1046. FIG. 10Q depicts a rotatable element 1048. FIG. 10R depicts a rotatable element 1050 having a first slide fin 1052 and a second slide fin 1054. FIG. 10S depicts a rotatable element 1056 having an optimal swivel point 1058, a swivel point 1060, and a securing point 1062. FIG. 10T depicts a slideable element 1064 having an optimal slide aperture 1066, a first pivot point 1068, and a second pivot point 1070. FIG. 10U depicts a side view of a locking joint of a slideable element 1072 having a swivel 1074 and a base 1076.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
   a first rotatable element comprising a first edge, a second edge, and a first aperture, wherein the first edge comprises a first notch and a first tapered lower edge, and wherein the second edge comprises a first arcuate lower portion;
   a second rotatable element comprising a third edge, a fourth edge, and a second aperture, wherein the third edge comprises a second notch and a second tapered lower edge, and wherein the fourth edge comprises a second arcuate lower portion;
   a pivoting member disposed through the first aperture and the second aperture;
   a protrusion disposed on the first rotatable element; and
   a depression disposed on the second rotatable element;
   wherein the first rotatable element and the second rotatable element pivot between a first position and a second position via the pivoting member, wherein a width of a lower portion of the first rotatable member and second rotatable member in the first position is less than a width of a strut opening, and wherein a width of the lower portion of the first rotatable member and second rotatable member in the second position is greater than the width of the strut opening; and
   wherein the protrusion is secured in the depression to prevent pivoting of the first rotatable element relative to the second rotatable element in the first position.

2. The system of claim 1, wherein the first notch comprises a first innermost edge and a first re-entrant edge.

3. The system of claim 2, wherein the second notch comprises a second innermost edge and a second re-entrant edge.

4. The system of claim 3, wherein the first re-entrant edge and the second re-entrant edge contact downward flanges of a strut in a third position, and wherein the position of the first and second rotatable elements relative to the strut is maintained in the third position.

5. The system of claim 3, wherein the first innermost edge and the second innermost edge are flat relative to a local plane in the first position.

6. The system of claim 3, wherein the first re-entrant edge and the second re-entrant edge are angled relative to a local plane in the first position.

7. The system of claim 1 further comprising:
a first leg, wherein the pivoting member is disposed through the first leg.

8. The system of claim 7 further comprising:
a second leg, wherein the first leg is detachably attached to the first leg via a fastener.

9. The system of claim 7 further comprising:
at least one stop disposed in the first leg, wherein the at least one stop limits rotation of at least one of: the first rotatable element and the second rotatable element relative to the first leg.

10. The system of claim 1 further comprising:
at least one elastic element connected to the first rotatable element and the second rotatable element, wherein the at least one elastic element maintains the first rotatable element and the second rotatable element in the first position.

11. The system of claim 10 wherein the at least one elastic element is a spring.

12. The system of claim 1 further comprising:
an aperture disposed in the second rotatable element, wherein the aperture receives the protrusion in the second position to prevent further pivoting of the first rotatable element relative to the second rotatable element.

13. An apparatus, comprising:
a first leg of a strut clip;
a first rotatable element rotatably attached to the first leg of the strut clip at a first aperture, wherein the first rotatable element has a tapered lower edge;
a second rotatable element rotatably attached to the first leg of the strut clip at the first aperture, wherein the second rotatable element has a tapered lower edge;
a first notch of the first rotatable element disposed on a longitudinal edge of the first rotatable element;
a second notch of the second rotatable element disposed on a longitudinal edge of the second rotatable element, wherein the first notch is disposed distal from the second notch;
one or more stops disposed in the first leg of the strut clip, wherein the one or more stops limits rotation of at least one of: the first rotatable element and the second rotatable element via contact with at least one of: an upper edge of the first rotatable element and an upper edge of the second rotatable element; and
a first elastic element disposed between distal longitudinal edges of the first rotatable element and the second rotatable element.

14. The apparatus of claim 13 wherein the one or more stops comprise two stops, wherein a first stop of the two stops is positioned to rotatably restrain the first rotatable element via contact with the upper edge of the first rotatable element, and wherein a second stop of the two stops is positioned to rotatably restrain the second rotatable element via contact with the upper edge of the second rotatable element.

15. The apparatus of claim 13 wherein the first elastic element is disposed between a first protrusion of the first rotatable element and a second protrusion of the second rotatable element, wherein the first protrusion is substantially perpendicular to a front face of the first rotatable element, wherein the second protrusion is substantially perpendicular to a front face of the second rotatable element, and wherein the first protrusion is substantially parallel to the second protrusion.

16. The apparatus of claim 13 wherein the first elastic element is a spring.

17. The apparatus of claim 13 further comprising:
a second leg of the strut clip;
a third rotatable element rotatably attached to the second leg of the strut clip at a second aperture, wherein the third rotatable element has a tapered lower edge;
a fourth rotatable element rotatably attached to the second leg of the strut clip at the second aperture, wherein the fourth rotatable element has a tapered lower edge;
a third notch of the third rotatable element disposed on a longitudinal edge of the third rotatable element;
a fourth notch of the fourth rotatable element disposed on a longitudinal edge of the fourth rotatable element, wherein the third notch is disposed distal from the fourth notch;
one or more stops disposed in the second leg of the strut clip, wherein the one or more stops limits rotation of at least one of: the third rotatable element and the fourth rotatable element via contact with at least one of: an upper edge of the third rotatable element and an upper edge of the fourth rotatable element; and
a second elastic element disposed between distal longitudinal edges of the third rotatable element and the fourth rotatable element.

18. The apparatus of claim 13 further comprising:
a third aperture, wherein the first leg of the strut clip and the second leg of the strut clip are detachably attached via the third aperture.

19. The apparatus of claim 13 wherein the first leg of the strut clip is identical to the second leg of the strut clip.

* * * * *